United States Patent
Thiers (10) Patent No.: US 9,019,698 B2
(45) Date of Patent: Apr. 28, 2015

(54) MOUNTING SYSTEM FOR ELECTRONIC DEVICE

(71) Applicant: Jean-Michel Thiers, Sunnyvale, CA (US)

(72) Inventor: Jean-Michel Thiers, Sunnyvale, CA (US)

(*) Notice: Subject to any disclaimer, the term of this patent is extended or adjusted under 35 U.S.C. 154(b) by 224 days.

(21) Appl. No.: 13/905,128

(22) Filed: May 30, 2013

(65) Prior Publication Data
US 2014/0355200 A1 Dec. 4, 2014

(51) Int. Cl.
| G06F 1/16 | (2006.01) |
| H04W 88/02 | (2009.01) |
| G01C 21/26 | (2006.01) |
| B62J 11/00 | (2006.01) |
| F16M 11/04 | (2006.01) |
| F16M 11/10 | (2006.01) |
| F16M 11/20 | (2006.01) |
| F16M 13/00 | (2006.01) |
| F16M 13/02 | (2006.01) |
| B60R 11/02 | (2006.01) |
| H04M 1/04 | (2006.01) |
| B60R 11/00 | (2006.01) |

(52) U.S. Cl.
CPC ............ *H04W 88/02* (2013.01); *G01C 21/265* (2013.01); *B62J 11/00* (2013.01); *F16M 11/041* (2013.01); *F16M 11/105* (2013.01); *F16M 11/2014* (2013.01); *F16M 11/2021* (2013.01); *F16M 13/00* (2013.01); *F16M 13/02* (2013.01); *B60R 11/0241* (2013.01); *B60R 2011/0071* (2013.01); *B60R 2011/0078* (2013.01); *B60R 2011/008* (2013.01); *H04M 1/04* (2013.01); *Y10S 248/922* (2013.01)

(58) Field of Classification Search
USPC ................ 345/173, 158, 541, 545, 501, 619; 320/115, 106, 107, 108, 109, 104; 455/456.3, 557, 67.12, 635, 582, 418, 455/530; 248/558, 309.3, 122.1, 917, 200, 248/922, 346.05, 550, 566, 556.1, 557, 248/525.1, 575.1; 361/679.41, 679.02, 361/679.44, 679.36, 679.39, 679.34, 361/679.59, 679.58, 679.31, 679.33, 361/679.04, 679.06, 679.27
See application file for complete search history.

(56) References Cited

U.S. PATENT DOCUMENTS

| D544,462 | S | 6/2007 | Patel |
| 7,256,990 | B2 * | 8/2007 | Grunow et al. .......... 361/679.41 |
| 7,944,710 | B2 | 5/2011 | Marten |
| 2006/0023251 | A1 * | 2/2006 | Petteruti et al. .............. 358/1.15 |
| 2008/0164845 | A1 * | 7/2008 | Choi .............................. 320/115 |
| 2010/0118505 | A1 | 5/2010 | Marten |

OTHER PUBLICATIONS

Mophie, "Mophie Extended Battery Case," <mophie juice pack helium™ iPhone 5 Extended Battery Case>, last visited May 29, 2013.

(Continued)

*Primary Examiner* — Hung Duong (57) ABSTRACT

A mounting system for an electronic device may include a dock interface assembly and a case assembly. The dock interface assembly may include a dock housing having one or more contacts. The case assembly may include an alignment feature and a case printed circuit board having one or more conductive traces corresponding to the contacts. The dock interface assembly and/or the case assembly may have a metallic element configured complementary to one or more magnets provided with a remaining one of the dock interface assembly and the case assembly for magnetic coupling of the case assembly to the dock interface assembly. The dock housing may be configured to be received by the alignment feature such that at least one of the contacts is electrically coupled to a corresponding one of the conductive traces.

20 Claims, 10 Drawing Sheets

(56) References Cited

OTHER PUBLICATIONS

Duracell, "Duracell MyGrid", <Amazon.com: Duracell Mygrid Starter Kit—1-Count: Cell Phones & Accessories>, last visited May 29, 2013.

Nexus, "Nexus 4 Wireless Charging System," <Nexus 4 wireless charging orb finally selling through Google Play for $59.99 | The Verge>, last visited May 29, 2013.

LaunchPort, "LaunchPort Charging System," <http://www.launchport.com/products>, last visited May 29, 2013.

Magnetyze, screen shot of Magnetyze web site, accessed on Sep. 2, 2012.

* cited by examiner

MOUNTING SYSTEM FOR ELECTRONIC DEVICE

FIELD

The present disclosure relates generally to portable electronic devices and, more particularly, to a mounting system for an electronic device such as a smart phone.

BACKGROUND

An increasing number of portable electronic devices have been developed in recent years. Such portable electronic devices include smart phones, tablets, media players, navigation systems, and a variety of other portable electronic devices. Such electronic devices typically include one or more connecting ports for linking the electronic device to data and power via an external cable. In order to minimize their size, weight, and cost, such portable electronic devices typically have a relatively small battery with limited battery capacity. The limited battery capacity of such portable electronic devices forces users to recharge the battery using the external cable. The physical connection between the electronic device and the external cable requires careful attention by the user to align the external cable with the exact location of the connector port on the electronic device. In addition, the user must carefully orient the connector for successful engagement to the connector port on the electronic device.

Many users frequently operate their portable electronic devices in a variety of different environments. For example, many users use their smart phones at home, at the office, and while travelling in an automobile or on public transportation. Whether at home, at work, or in a vehicle, it is often advantageous to support an electronic device in a clearly visible position while the user performs other activities. In addition, it is advantageous to support the electronic device in a secure manner. Of the multitude of mounts available on the market, mounts that securely support the electronic device unfortunately require a two-handed operation to insert the electronic device in position on the mount. For mounts that allow for battery charging, the connection to the electronic device is often performed via a connecting port which requires two-handed operation for careful alignment of the connecting port with an external cable. The external cable and forcing also adds visual and physical clutter to the area where the electronic device is used.

Many device manufacturers have standardized the connecting ports to be similar across at least each manufacturer's series of smart devices, if not across the whole industry. The standardization of the connecting ports is convenient for the consumer because it allow for the connection and charging of different devices using a single cable configuration. Unfortunately, this convenience is lost when a user needs to mount their device for battery charging or for hands-free operation due to the fact that most charging mounts are either specific to a device, or the mount requires two-handed adjustment of the mount so that the mount will accept the device.

Now that smart devices play such an important role in many people's lives, it becomes a great nuisance when such smart devices fail to perform due to lack of battery power. In this regard, it has become increasingly desirable for device and accessory manufacturers to provide a viable solution to the limited battery power for portable electronic devices. One attempt at solving the problem includes wireless charging technology. Wireless technology is now available as an accessory for many smart devices in the way of a specialized case, and as a built-in option. Although certain wireless charging arrangements offer a means for charging an electronic device, such wireless charging arrangements also have a number of inherent drawbacks. One such drawback is the fact that the wireless charging of a battery creates heat which reduces the life of the battery. In addition, current wireless charging technology is slower than conventional charging methods. Furthermore, wireless charging technology lacks a means for sending data to the electronic device during the charging operation. In addition, current wireless charging technology is not understood to allow for rotation of an electronic device from portrait mode (e.g., vertical orientation) to landscape mode (e.g. horizontal orientation) while maintaining the power and data transfer capability.

In light of the above-noted limitations, the prior art includes several attempts to overcome deficiencies associated with the connecting and mounting of electronic devices and, more particularly, the mounting of smart devices such as smart phone and tablets. For example, U.S. Pat. No. 7,582,828, issued to Ryan, discloses a system and method for mounting an electrical device on a wall. The electrical device has a mount and a base. The base connects to an electrical outlet on a surface, and has a first electrical connector, and a magnetic face plate. The electrical device has a magnet and a second electrical conductor that are positioned so that the magnet mates with the magnetic face plate, and the second electrical connector mates with the first electrical connector.

U.S. Patent Application Publication No. 2006/0086873, submitted by Chen, discloses a fastening apparatus for a detachable car multimedia player includes a first fastening member and a second fastening member. The first fastening member is fastened to an anchor seat and has a strut which has a wing flap extended sideward from the top end. The second fastening member is located on the bottom of the car multimedia player and has a coupling bore. The first fastening member may be coupled with the second fastening member to rapidly mount the car multimedia player and remove the car multimedia player when not in use to prevent theft and dust pollution.

U.S. Pat. No. 6,565,363, issued to Downing, discloses a modular jack system that utilizes magnetic attraction to draw a plug into a jack and then maintain it therein. The modular jack system utilizes plug and jack having at least one pair of cooperating magnets polarized so that the magnets on the plug are drawn to the magnets on the jack thereby pulling the plug into the proper connected position and maintaining it therein.

U.S. Pat. No. 3,786,391, issued to Mathauser, discloses a magnetic self-aligning electrical connector comprising a pair of connector or coupling halves each having electrical contact means therein and one of said coupling halves having magnetic means therein disposed opposite means in said other coupling half for cooperation with said magnet means to hold said coupling halves together with the electrical contact means in electrically conducting contacting relationship with one another, said electrical contact means in one of said coupling halves mounted for movement relative to the coupling half to insure alignment between the electrical contact means even though the coupling halves are misaligned.

U.S. Pat. No. 3,808,577, issued to Mathauser, discloses a quick-disconnect, magnetic, self-aligning telephone jack or other communication equipment connection, including a male connector half and a female connector half, each with self-aligning magnetic means therein to hold the male and female halves together and cooperating electrical contact means in the male and female connector halves to establish electrical connection between a telephone or other communication equipment and a source of electrical energy.

U.S. Pat. No. 5,708,874, issued to Schrock et al, discloses an apparatus for fixing a flash unit to a camera. The apparatus includes mounting magnets and a structure for shielding the fields produced by the mounting magnets in a first undocked position and for exposing the fields produced by the mounting magnets in a second docked position. The apparatus further includes a mounting structure effective in the first undocked position for causing the flash unit to be moveably mounted to the camera and for leaving the shielding structure in the first undocked position and effective when the flash unit is moved to the second docked position for causing the shielding structure to be in the second docked position whereby the exposed fields produced by the mounting magnets cause the flash unit to be fixed to the camera.

U.S. Pat. No. 3,848,097, issued to Tucker, discloses a mount for a wall telephone that is attached to a permanently fixed telephone outlet by engaging it guide of the mount with a face plate of the outlet and swinging the mount about it rotational axis of the guide towards the outlet. Magnets on the mount engage it striker plate of the outlet to secure the mount onto the outlet. A cord adapter having male stabs is in the mount and floats there so that the stabs can find receptacles in it jack mounted in the outlet. A trigger having a relatively large mechanical advantage allows the mount to be removed from the outlet.

Although some of the above-referenced patents disclose a means of connecting and holding electronic devices, none of the references are understood to disclose an arrangement addressing all of the above-mentioned drawbacks associated with the power and data connection combined with secure mounting of the electronic device. More specifically, none of the above-mentioned references are understood to disclose a mount allowing for single-handed operation to secure and connect an electronic device.

As can be seen, there exists a need in the art for a mounting system for an electronic device that allows for simple one-handed movement to securely install and connect the electronic device to a mount. Furthermore, there exists a need in the art for a mounting system for an electronic device that can accommodate a variety of different types of electronic devices. Additionally, there exists a need in the art for a mounting system for an electronic device that eliminates the clutter associated with loose cables. Also, there exists a need in the art for a mounting system for an electronic device that provides the same speed of charging and data transmission that is available with conventional cables. Finally, there exists a need in the art for a mounting system for an electronic device that allows for rotation of the electronic device on the mount while maintaining a data and power connection with the mount.

SUMMARY

The above-described deficiencies and drawbacks associated with conventional charging and mounting systems for electronic device are specifically addressed and alleviated by a mount system as disclosed herein and which may incorporate a dock interface assembly. The dock interface assembly may include a dock housing having one or more contacts. The case assembly may include an alignment feature and a case printed circuit board having one or more conductive traces corresponding to the contacts. The dock interface assembly and/or the case assembly may have a metallic element configured complementary to one or more magnets provided with a remaining one of the dock interface assembly and the case assembly for magnetic coupling of the case assembly to the dock interface assembly. The dock housing may be configured to be received by the alignment feature such that at least one of the contacts is electrically coupled to a corresponding one of the conductive traces.

Although the mounting system of the present disclosure may be configured for use on any electronic device requiring a removable electrical connection, the mounting system is described in the context of a dock interface assembly equipped with a round-shaped magnet holder which surrounds a set of spring-loaded electrical contacts. The spring-loaded electrical contacts may be assembled in radial arrangement and may include a contact being electrically couplable to a center conductive trace, with successive contacts being aligning with matching conductive traces on the case printed circuit board of the case assembly or directly on the electronic device. The dock interface assembly may be coupled to an adjustable mount that may be mounted on a desk or table, clamped to a handlebar of a bicycle, or any one of a variety of other embodiments.

In an embodiment, the mounting system may include a dock interface assembly including a dock housing containing one or more magnets and one or more contacts protruding from the dock housing. The mounting system may include a case assembly having an alignment feature, a metallic ring, and a case printed circuit board having one or more conductive traces corresponding to the contacts. The metallic ring may be configured complementary to an arrangement of the magnets for magnetic coupling of the metallic ring to the dock interface assembly. The dock housing may have an outer perimeter configured to be received by the alignment feature such that each one of the contacts engages a corresponding one of the conductive traces. The contacts may be configured to be electrically coupled to the conductive traces of the case printed circuit board.

In a further embodiment, disclosed is a mounting system for a smart phone. The mounting system may include a dock interface assembly including a dock housing containing one or more magnets arranged in a circular array, the dock housing containing one or more contacts protruding from the dock housing. The case assembly may have a cover which may include an alignment feature configured as a circular opening, a metallic ring disposed within the circular opening, and a case printed circuit board circumscribed by the metallic ring and having one or more annular conductive traces corresponding to the contacts. The metallic ring may be configured complementary to an arrangement of the magnets for magnetic coupling of the metallic ring to the dock interface assembly. The dock housing may have a circular outer perimeter configured to be received by the alignment feature such that each one of the contacts engages a corresponding one of the conductive traces. The contacts may be configured to be electrically coupled to the conductive traces of the case printed circuit board. The case printed circuit board may include a connector configured to engage a connector port of the smart phone. The contacts may be coupled to a cable transmitting at least one of power and data to the contacts, into the conductive traces, through the connector and into the smart phone while the smart phone is magnetically coupled to the dock interface assembly and during rotation thereof.

The features, functions and advantages that have been discussed can be achieved independently in various embodiments of the present disclosure, or may be combined in yet other embodiments, further details of which can be seen with reference to the following description and drawings below

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
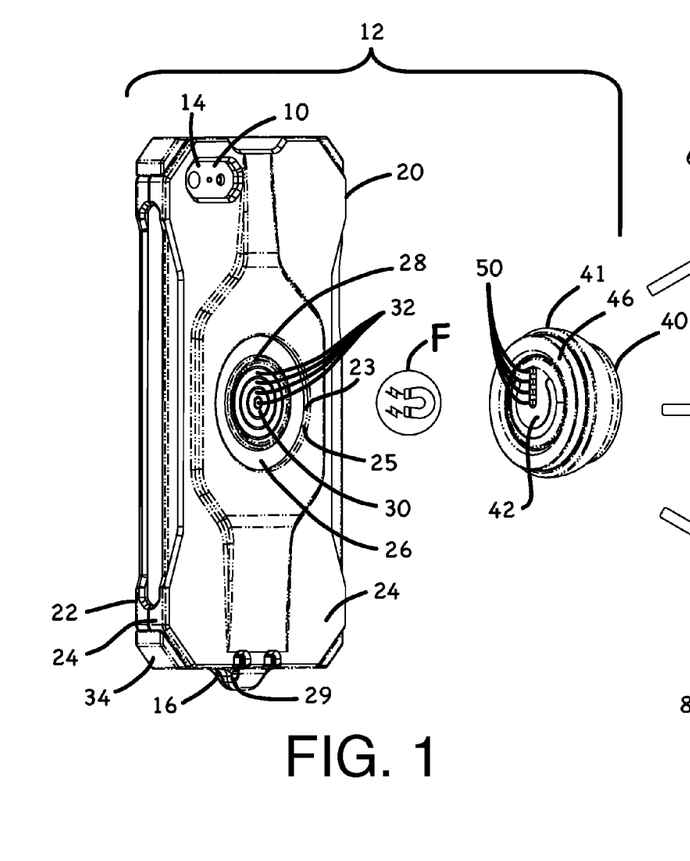
FIG. 1 is an exploded perspective view of a mounting system for a smart phone and including a dock interface assembly for mechanically coupling with the smart phone.

Referring now to the drawings wherein the showings are for purposes of illustrating various embodiments of the present disclosure, shown in FIG. 1 is an exploded view of a mounting system 12 for an electronic device 10. In the embodiment shown, the electronic device 10 is configured as a smart phone 14. However, the mounting system 12 as disclosed herein may be implemented on any one of a variety of different configurations of electronic devices 10, and is not limited to implementation on a smart phone 14. The mounting system 12 may include a dock interface assembly 40 to which the electronic device 10 and/or a case assembly 20 may be magnetically coupled by magnetic attraction F. The dock interface assembly 40 may include a magnet holder 46 and/or one or more magnets 48. The case assembly 20 which may include a metallic element 26 such as a metallic ring. Advantageously, the magnetic attraction F between the magnets 48 and the metallic element allows for use of the dock interface assembly 40 in a variety of different environments including environments where there is significant vibration.

Figure 2:
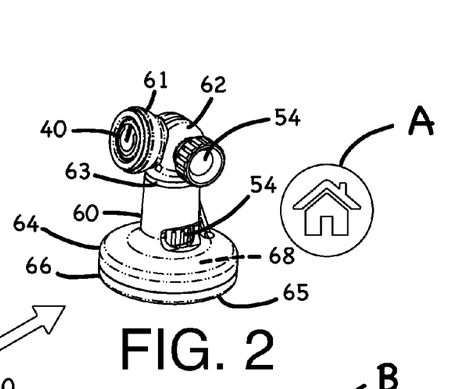
FIG. 2 is a perspective view of the dock interface assembly integrated into a dock assembly for mounting on a desk or table.

In an embodiment, the dock interface assembly 40 may be used on a dock assembly 60 for home use A as shown in FIG. 2. In a further embodiment, the dock interface assembly 40 may be directly mounted on a surface such as a surface in a vehicle interior (e.g., an automobile dashboard) such as for vehicle use B. The dock interface assembly 40 may also be used on a dock assembly 80 for mounting to a bicycle for bicycle use C. However, the dock interface assembly 40 may be incorporated for use in any one of a variety of different environments and applications, and is not limited to the above-described embodiments for home use, vehicle use, and bicycle use. In situations where there is a high risk of the magnetic attraction F being broken and the electronic device 10 being knocked off of the dock interface assembly 40, a wrist strap (not shown) may be used on the case assembly 20 via a wrist strap hole 29 that may be included with the case assembly 20 of the electronic device 10. The wrist strap (not shown) may be placed around the bar-clamp dock assembly 80 prior to mounting the electronic device 10. If the electronic device 10 is knocked off of the dock interface assembly 40, the electronic device 10 will be retained by the wrist strap (not shown).

The dock interface assembly 40 may include one or more contacts 50. The contacts may protrude from the dock housing 41. In an embodiment, the contacts 50 may be spring-loaded, although the contacts 50 may be provided in a non-spring-loaded arrangement (not shown). The case assembly 20 may include an alignment feature 25, the metallic element 26, and a case printed circuit board (PCB) 30. As indicated above, one end of the case PCB 30 may have one or more conductive traces 32 which may be arranged to correspond to the contacts 50. An opposite end of the case PCB 30 may include a connector 36 which may be electrically coupled to the conductive traces 32 via internal wires (not shown). The connector 36 may be configured to engage a connector port 16 of the electronic device 10. As indicated above, the conductive traces 32 may be annularly-shaped and may be exposed to an exterior on the electronic device 10 such as on a rear cover 24 of the case assembly 20 as shown in FIG. 1. The metallic element 26 may be configured as a metallic ring, although the metallic element 26 may be provided in other shapes and sizes, and is not limited to a ring shape. The metallic element 26 may be formed of a magnetically-attractable material such as steel, and may be sized and configured to circumscribe the conductive traces 32 of the case PCB 30. A sleeve such as a circular mounting sleeve 28 may interconnect the outer radius of the case PCB 30 with the inner radius of the metallic element 26.

In FIG. 1, the dock interface assembly 40 may include an annularly-shaped magnet holder 46 configured for holding a plurality of the magnets 48 (not shown). The magnets of the dock interface assembly 40 may be configured complementary to the metallic element 26 (e.g., metallic ring) of the case assembly 20 such that the case assembly 20 may be magnetic coupled to the dock interface assembly. Alternatively, in an embodiment not shown, the dock interface assembly 40 may include the metallic element 26 such as a metallic ring, and the case assembly 20 may include a plurality of magnets 48 (not shown) configured complementary to the metallic element 26 such that the case assembly 20 may be magnetic coupled to the dock interface assembly.

In FIG. 1, the magnets 48 are provided with the magnet holder 46 and may be arranged in a circular array. The circular array of the magnets 48 may be sized and configured complementary to the size and configuration of the metallic element 26 to facilitate magnetic coupling to the metallic element 26 of the dock interface assembly 40. However, the magnet holder 46 and the magnets 48 may be provided in any one of a variety of different arrangements, and is not limited to a circular array. The contacts 50 may protrude from the dock housing 41 and may be arranged in such a manner that each one of the contacts 50 is aligned with a conductive trace 32 of the printed circuit board 30 of the case assembly 20. As described in greater detail below, the mounting system 12 may include an alignment feature 25 for aligning the contacts 50 with the conductive traces 32 when the electronic device 10 is magnetically coupled to the dock interface assembly 40. In an embodiment, the dock housing 41 or magnet holder 46 may have a corresponding alignment feature such as an outer perimeter configured to be received by the alignment feature 25 of the case assembly 20 such that each one of the contacts 50 may engage a corresponding conductive trace 32 of the case PCB 30.

In FIG. 1, the alignment feature 25 may comprise a circular opening 23 or a circular depression that may be formed in the rear cover 24 of the case assembly 20. However, the alignment feature 25 may be provided in other configurations. The dock housing 41 or magnet holder 46 may have a shape configured to engage the alignment feature. For example, the magnet holder or dock housing may have a circular outer shape that may be sized and configured to nest within the circular opening 23 of the rear cover 24. One or more of the conductive traces 32 may have a circular configuration, an annular configuration, or a ring-shaped configuration, although the conductive traces 32 may be provided in other shapes such as in arcuate shapes (not shown) of less than 360 degrees. The conductive traces 32 may be arranged in a manner such that the contacts 50 are maintained in contacting relation with the conductive traces 32 when the electronic device 10 is rotated relative to the dock interface assembly 40. In this manner, the contacts 50 may be substantially continuously electrically coupled to the conductive traces 32 to allow the electronic device to receive continuous power and/or data regardless of the clocking orientation of the electronic device 10 relative to the dock interface assembly 40. The contacts 50 may be spring-loaded such that the contacts 50 are maintained in continuous contacting relation with the conductive traces 32 during rotation of the electronic device 10 relative to the dock interface assembly 40.

Importantly, the dock interface assembly 40 of the present disclosure represents a significant improvement over prior art mounting systems 12 for electronic devices 10. More specifically, in the present disclosure, the contacts 50 may be arranged as to allow the electronic device 10 to rotate relative to the dock interface assembly 40 while maintaining continuous engagement between the contacts 50 and the conductive traces 32. As indicated above, the dock interface assembly 40 may include the dock housing 41 and/or the magnet holder 46 which may have a generally round or circular shape to engage with a corresponding circular feature. As indicated above, the circular feature may comprise the circular opening 23 or circular depression that may be formed in the rear cover 24 of the case assembly 20. In this regard, the magnet holder 46 may advantageously act as a locator to facilitate the alignment of each contact 50 with its corresponding conductive trace 32. Although FIG. 1 illustrates the contacts 50 in a radially linear arrangement, the contacts 50 may be provided in any arrangement including a non-linear arrangement.

Although the dock interface assembly 40 of the present disclosure may be implemented for use with any type of housing for any type of electronic device 10, in the present disclosure, the dock interface assembly 40 is described in the context of an electronic device 10 mounted inside a case assembly 20 as shown in the figures. In an alternative embodiment not shown, the conductive traces 32 on the printed circuit board 30 may be directly built into an outer case (not shown) of the electronic device 10, as opposed to the separate case assembly 20 covering the electronic device 10 as illustrated in the present disclosure. In an embodiment, the electronic device 10 may have its conductive traces 32 directly applied to an outside surface of its outer case as its primary means of data, music, and/or power or charging connection, and thereby eliminating the need for an external case assembly 20. As described below, the locating surface 25 may also be built into the electronic device 10 to allow for proper alignment of the conductive traces 32 with the contacts 50 of the dock interface assembly 40.

FIG. 2 illustrates an embodiment of a dock assembly 60 for home use A. The dock assembly 60 may be comprised of the dock housing 61 being effectively the equivalent of the generic dock housing 41 of FIG. 1, but having an interface allowing for rotation. As described in greater detail below, the dock housing 61 may be integrally formed with a locking hinge 62. The locking hinge 62 may be pivotable to allow for angular (e.g., up and down) positioning of the electronic device 10. A tightening knob 54 may be used as the locking mechanism to lock the dock assembly 61 in position after adjusting an orientation of the electronic device 10. The locking hinge 62 may also be coupled to a dock housing base 64 that may allow for rotation about a vertical axis, itself being lockable by another tightening knob 54. A dock housing weight support 66 may also be included to support an internal weight 68 or mass for stabilizing and maintaining the position of the dock housing base 64 on a surface such as on a desk or a table or other surface.

Figure 3:
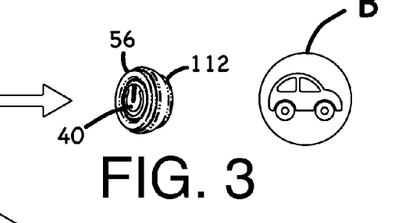
FIG. 3 is a perspective view of an embodiment of a dock interface housing configured as a dock assembly for mounting in an automobile.

FIG. 3 illustrates an embodiment of the dock interface assembly 40 having a dock assembly 56 that is the generic equivalent of the dock housing 41 of FIG. 1. The dock assembly 56 may be mounted directly to a surface such as the dashboard (not shown) of a vehicle such as an automobile. For example, double-sided foam adhesive tape 112 may be applied to the back side of the dock housing 41 to adhesively secure the dock housing 41 to the dashboard of a vehicle.

Figure 4:
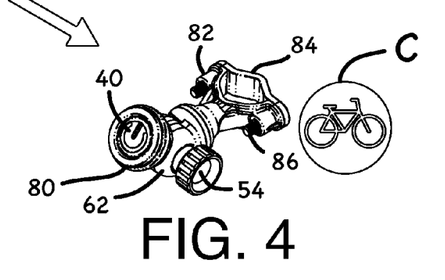
FIG. 4 is a perspective view of the dock interface assembly integrated into a dock assembly having a bar clamp housing for mounting on a bar such as a handlebar of a bicycle.

FIG. 4 illustrates an alternative embodiment of the dock interface assembly 40 such as for mounting to a tube or a bar (not shown) such as a handlebar of a bicycle or a motorcycle. The dock housing 41 may be integrated into or formed with a locking hinge 62 similar to that which is described and illustrated in FIG. 2. The locking hinge 62 may be removably clamped or coupled to a bar clamp housing 82. The bar clamp housing 82 may be shaped to allow a bar or tube to fit between the bar clamp housing and a bar clamp 84. Clamp screws 86 may be tightened to apply pressure on the bar clamp 84 to clamp to a bar such as a handlebar. The bar clamp 84 may have a V-shaped configuration. The bar clamp 84 may be positioned such that that V-shape is pointed outwardly to mount to a bar of relatively large diameter. The bar clamp 84 may be inverted such that the V shape points inwardly to allow for mounting to a bar of relatively small diameter.

Figure 5:
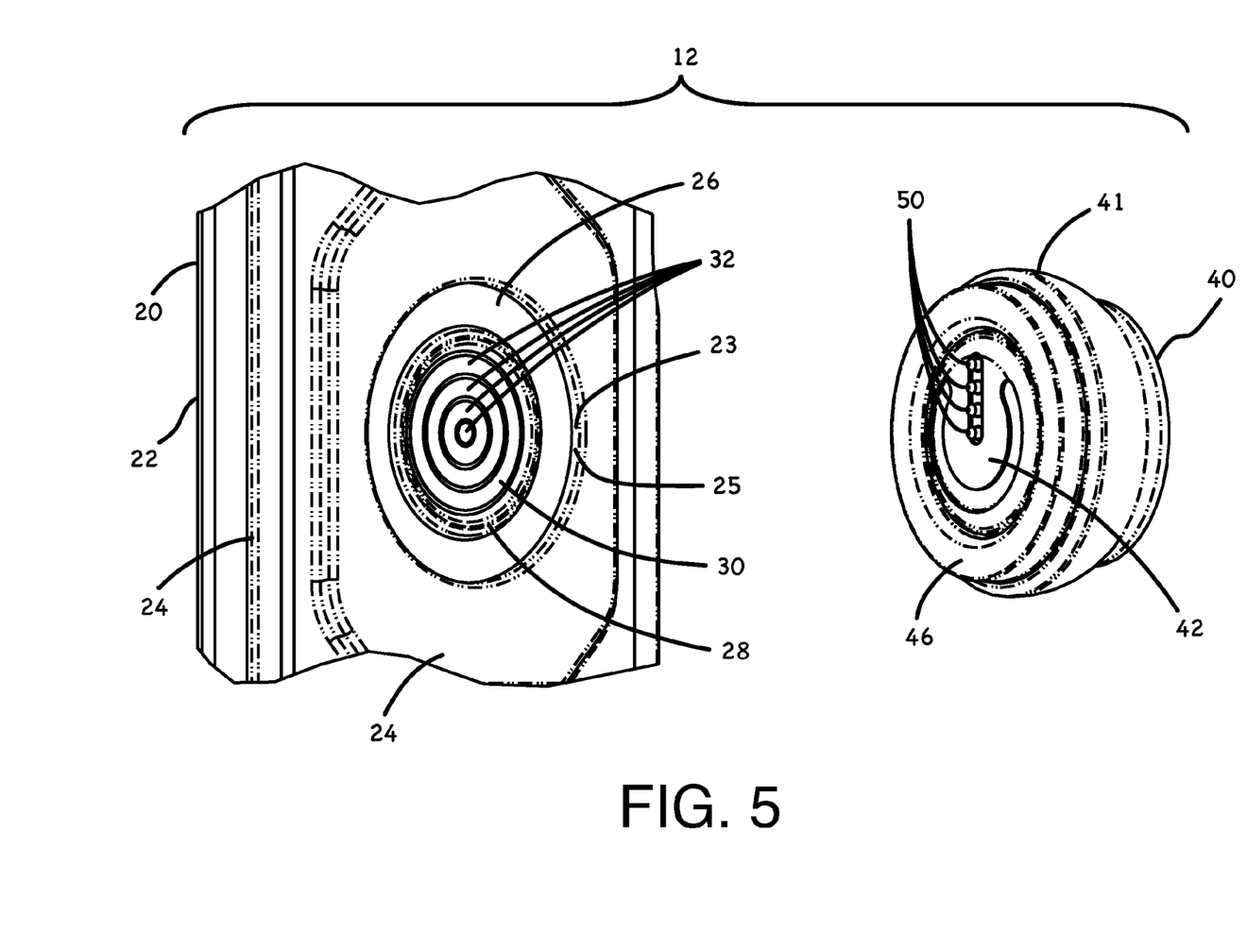
FIG. 5 is an enlarged perspective view of the mounting system including the dock interface assembly having spring-loaded contacts for engaging a corresponding number of conductive traces formed on a printed circuit board integrated into a cover of a smart phone.

FIG. 5 is an enlarged view of the mounting system 12 including the dock interface assembly 40 having contacts 50 for engaging a corresponding number of conductive traces 32 formed on a printed circuit board integrated into a cover of a smart phone 14. Although four (4) contacts 50 and four (4) conductive traces 32 are shown, any number of contacts 50 and conductive traces 32 may be provided. As indicated above, the contacts 50 and the conductive traces 32 may cooperate to facilitate transmission of power and/or data from external cable 90 and into the electronic device 10. In this regard, power and/or data may be transmitted through a universal serial bus (USB) cable 90, through the contacts 50, into the conductive traces 32, and into the smart phone 14 via the connector 36, all while the electronic device 10 (e.g., smart phone 14) is magnetically coupled to the dock interface assembly 40.

Advantageously, the present arrangement of the dock interface assembly 40 and conductive traces 32 provides a means for providing continuous power and/or continuous data to the electronic device 10 when the electronic device 10 is rotated relative to the dock interface assembly 40 while magnetically coupled thereto. In this regard, the electronic device 10 is rotatable relative to the dock interface assembly 40 when the metallic element 26 is magnetically coupled to the magnets 48 of the dock interface assembly 40, and may allow for up to 360 degrees of electronic device 10 relative to the dock interface assembly 40. In this manner, a user may rotate the electronic device 10 between any number of different orientations. For example, a user may rotate the electronic device 10 between a vertical orientation (e.g., portrait mode) such as for reading a document displayed on the electronic device 10, and a horizontal orientation (e.g., landscape mode) such as for watching a video displayed on the electronic device 10.

Figure 6:
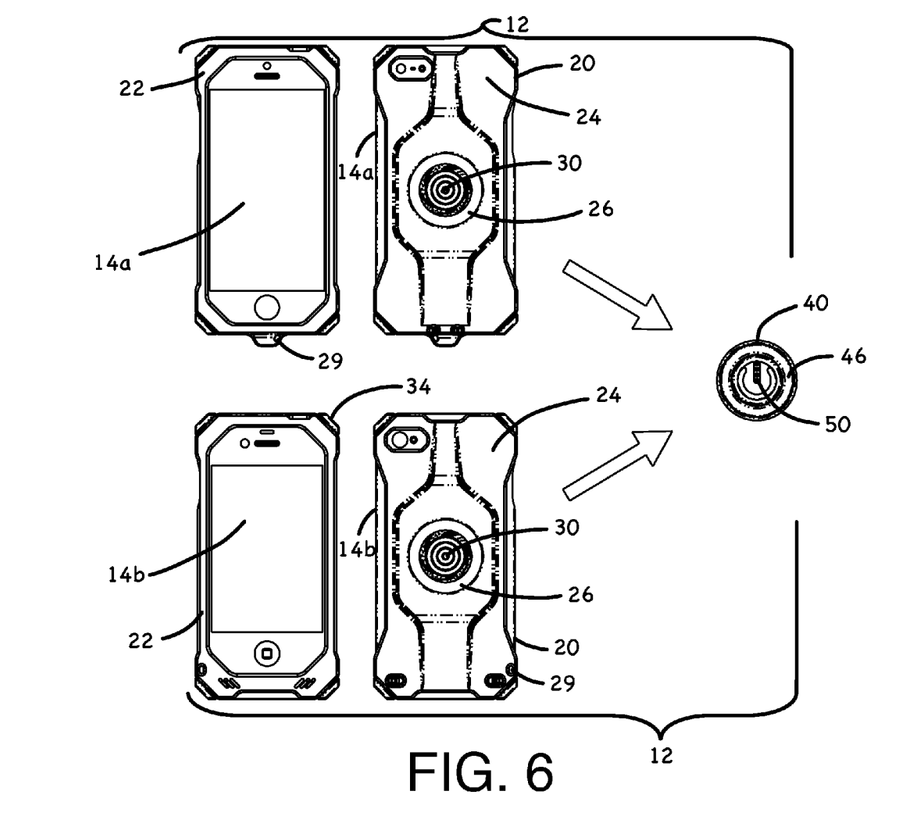
FIG. 6 is a top view of two different embodiments of the smart phone which may each be accommodated for mounting to the dock interface assembly.

FIG. 6 shows two (2) different embodiments of a smart phone 14 which may each be configured to be mountable to a common dock interface assembly 40. The first smart phone 14a and the second smart phone 14b may each have a front cover 22, a rear cover 24, and one or more rubber bumpers 34 at each corner to absorb shock in the event of abrupt contact with a hard surface. The second smart phone 14b may have a strap hole 29 as mentioned above. The first smart phone 14a may include a metallic element 26 and a case PCB 30 having conductive traces 32 that are compatible with a common dock interface assembly 40. Likewise, the second smart phone 14b may also include a metallic element 26 and a case PCB 30 having conductive traces 32 that are compatible with the common dock interface assembly 40. Advantageously, the dock interface assembly 40 may be used on one or more different mounting system 12 configurations, as described above and illustrated in FIGS. 2-4.

Figure 7:
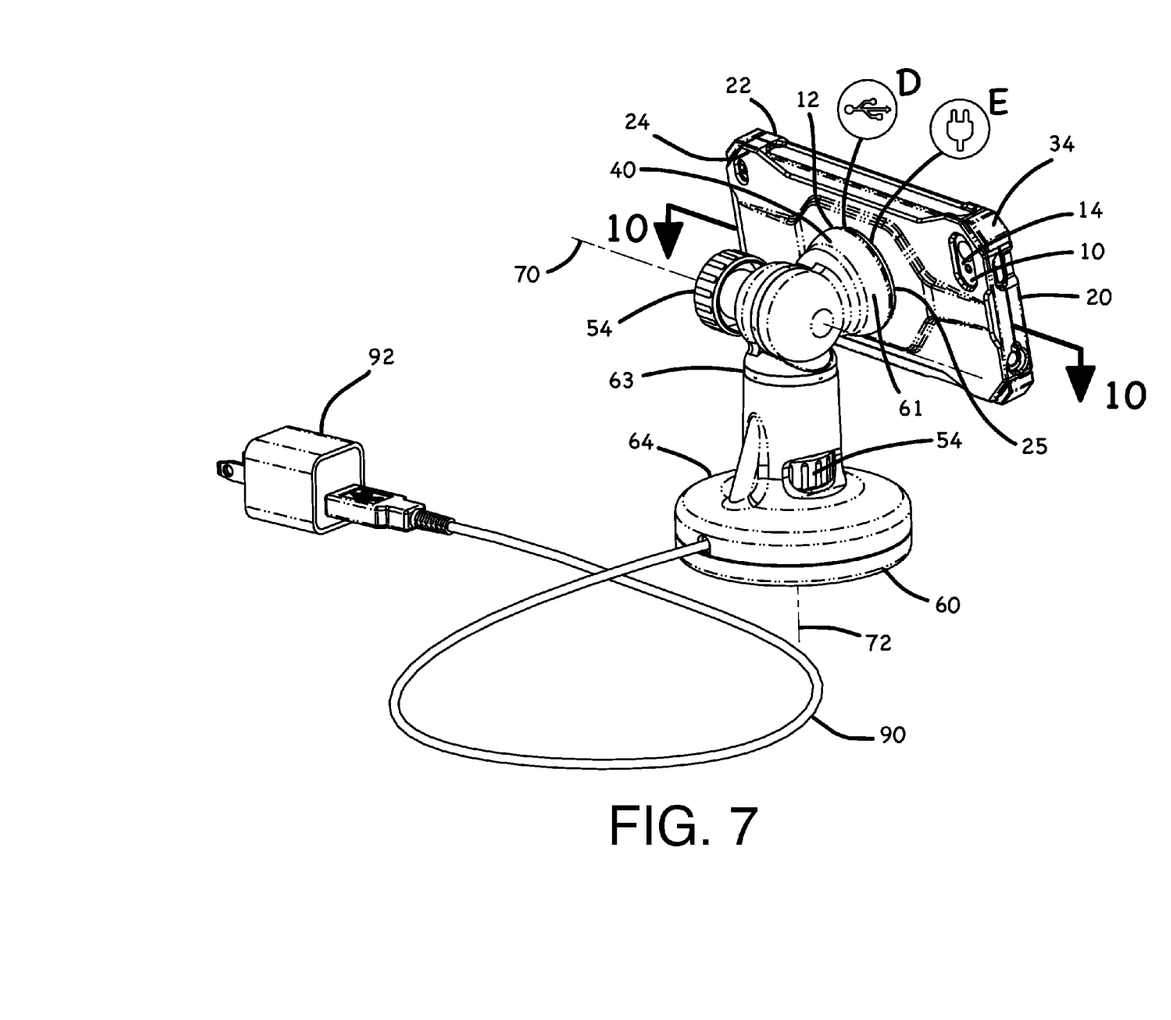
FIG. 7 is a perspective view of a smart phone mounted to the dock interface assembly shown in FIG. 2 and further illustrating a USB cable for transmitting power and/or data to the smart phone through the engagement of the spring-loaded contacts with the conductive traces.

FIG. 7 shows an electronic device 10 (e.g., a smart phone 14) mounted to the embodiment of the dock interface assembly 40 shown in FIG. 2. The dock interface assembly 40 may include a USB cable 90 for transmitting power and/or data to the electronic device 10 through the engagement of the spring-loaded contacts 50 with the conductive traces 32. The cable 90 may be coupled to a wall charger 92 for providing power for operating the electronic device 10 and/or for charging a battery (not shown) of the electronic device 10. The USB cable 90 may also be engaged to the USB port (not shown) of another computing device (not shown) for transferring power and/or data between the computing device and the electronic device 10 while magnetically coupled to the dock interface assembly 40. Although FIG. 7 illustrates a USB cable 90 used with the wall charger 92, the dock assembly 60 may include alternative data connections D and/or power connections E for transmitting data and/or power to the electronic device 10 using the mounting system 12 disclosed herein, and is not limited to the USB cable 90 illustrated in figures.

As indicated above, the dock interface assembly 40 of FIG. 7 may be configured for mounting to a stationary surface such as a desk or table. In this manner, a dock assembly 60 may include a dock assembly base 64. The dock assembly base 64 may include one or more weights (not shown) for providing stability to the dock assembly when magnetically coupling the electronic device 10 to the dock interface assembly 40. The dock assembly 60 may include a rotational joint for rotating the electronic device 10 about a vertical axis 72 for adjusting the horizontal orientation (i.e., the sideways or lateral orientation) of the electronic device 10, and a locking hinge 62 (e.g., an additional rotational joint) for adjusting the vertical orientation (i.e., the up and down angular orientation) of the electronic device 10 about a horizontal axis 70 of the dock assembly 60. One or more tightening knobs 54 may be included with the dock assembly 60 at each rotational joint in order to lock the orientation of the electronic device 10. At each rotational joint, one or more rubber seals 63 may be included for sealing the internal wiring and electronics inside the dock assembly 60.

Figure 8:
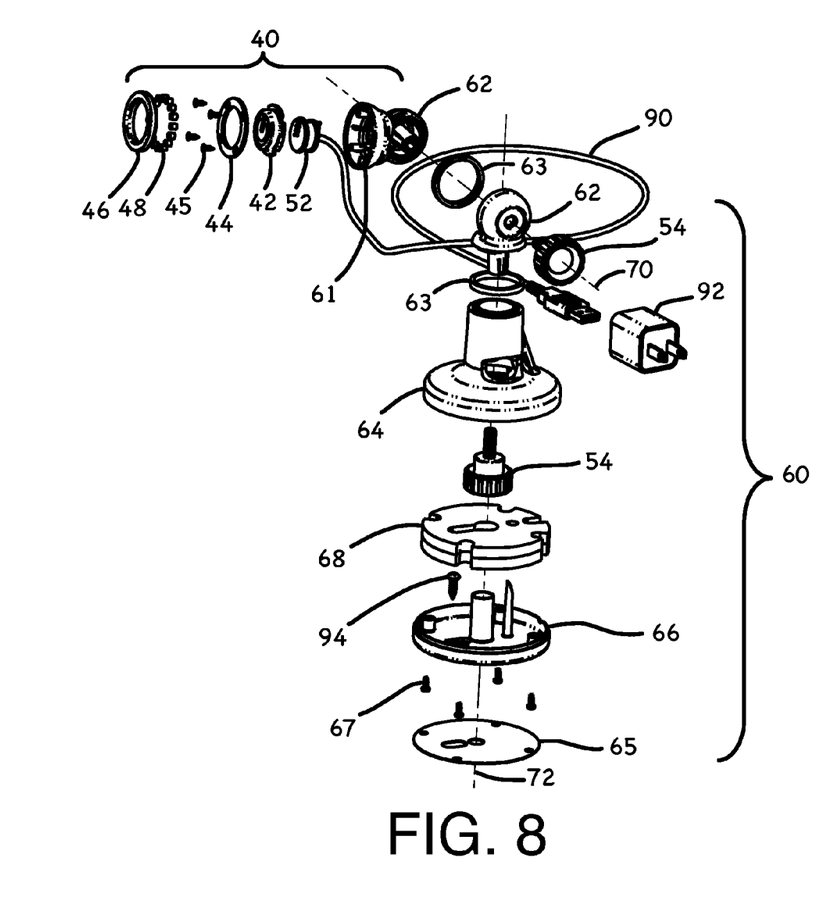
FIG. 8 is an exploded perspective illustration of the dock interface assembly and an exploded perspective illustration of the dock assembly embodiment of FIGS. 2 and 7 configured for mounting on a desk or table.

FIG. 8 is an exploded view of an embodiment of the dock interface assembly 40 and the dock assembly 60 as shown in FIG. 7. The dock interface assembly 40 is described in greater detail below with regard to FIG. 11. The dock assembly 60 may include the dock housing 61 which may be integrally formed with the locking hinge 62. As indicated above, a tightening knob 54 may be included to fix the orientation of the dock assembly after adjusting the orientation thereof. The locking hinge 62 may be coupled to a dock housing base 64 by another tightening knob 54. One or more weights 68 may be included with the dock assembly 60 to prevent the dock assembly 60 from being dragged along its resting surface (e.g., a table or desk) when the electronic device 10 is magnetically engaged to or removed from the dock interface assembly 40. The one or more weights 68 may be mounted to the dock assembly 60 weight support 66 via screws 67. To further help in reducing movement of the dock assembly 60 during mounting or removal of the electronic device 10, a rubber pad 65 may be affixed to an underside of the weight support 66 to increase frictional engagement of the dock assembly base 64 to the resting surface. Alternatively, the dock assembly 60 may be fixedly coupled to a resting surface such as a table or desk using one or more screws 94.

Figure 9:
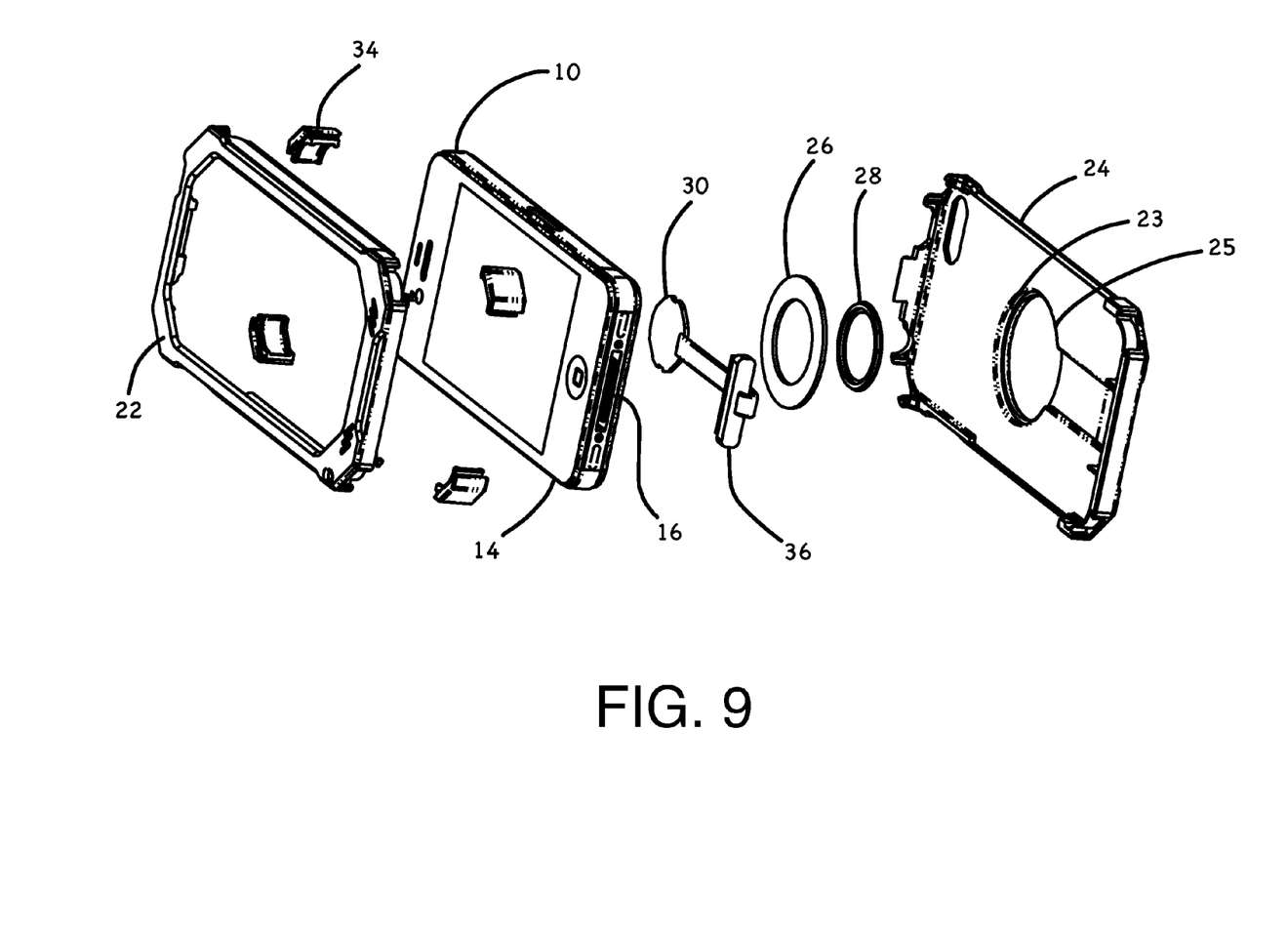
FIG. 9 is an exploded perspective illustration of a case assembly for a smart phone and wherein the case assembly may include the printed circuit board and a metallic ring for coupling to the dock interface assembly.

FIG. 9 is an exploded view of the components of an embodiment of the case assembly 20. The case assembly 20 may include a front cover 22 and a rear cover 24 for at least partially enclosing the electronic device 10, although the front cover 22 and the rear cover 24 may be integrally formed as a unitary structure (not shown). The case assembly 20 may include one or more bumpers 34 such as a rubber bumper at each corner. In an embodiment, the rear cover 24 may house or include the case PCB 30 which may be connected via internal wires (not shown) to a connector 36. The connector 36 may be configured to match a specific configuration of the connector port 16 of the electronic device 10. A mounting sleeve 28 may be included between the metallic element 26 and the printed circuit board 30. The mounting sleeve 28 may act as a mechanism for separating and locating the printed circuit board 30 relative to the metallic element 26.

Figure 10:
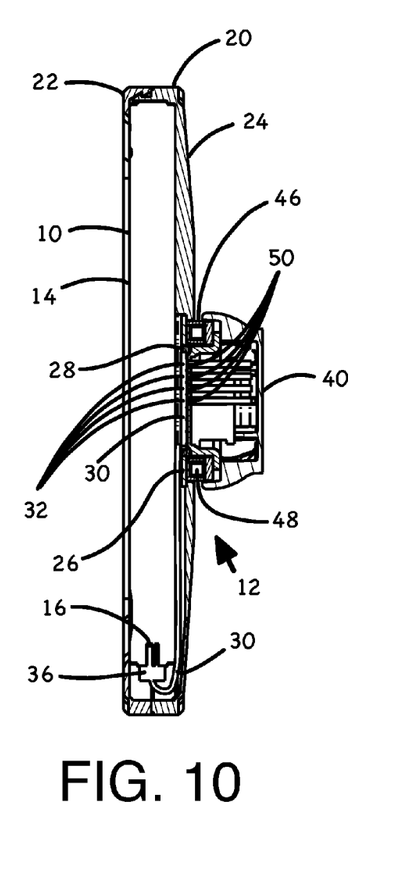
FIG. 10 is a cross-sectional illustration of a smart phone taken along line 10 of FIG. 7 and illustrating the smart phone being magnetically coupled to the dock interface assembly.

FIG. 10 is a cross section of an embodiment of the case assembly 20 magnetically coupled to the dock interface assembly 40 of FIG. 7. The case assembly 20 includes the front cover 22 which may be engaged to the rear cover 24 as indicated above. The rear cover 24 may include an alignment feature 25 which may comprise a circular opening 23 or other alignment feature 25 configuration. The circular opening 23 may be configured to receive the magnet holder 46 of the dock interface assembly 40. In an embodiment, the magnet holder 46 may have an outer perimeter that may be sized and configured to be received within the circular opening 23 such that each one of the contacts 50 engages a specific conductive trace 32. The metallic element 26 (e.g., metallic ring) may be mounted within the circular opening 23. The case PCB 30 may be circumscribed by the metallic element 26 and may be separated and bonded to the metallic element 26 by means of a circular mounting sleeve 28. The case PCB 30 may include internal wires (not shown) that may extend along an interior of the rear cover 24 and terminate at a connector 36. As indicated above, the connector may be specifically configured to engage a connector port 16 of the electronic device 10.

In FIG. 10, shown are the contacts 50 protruding from the dock interface assembly 40. Advantageously, the contacts 50 may be spring-loaded such that the contacts 50 are maintained in continuous contacting relation with the conductive traces 32 when the electronic device 10 is magnetically coupled to the dock interface assembly 40. In this regard, the spring-loaded contacts 50 are maintained in continuous engagement with the conductive traces 32 during rotation of the electronic device 10. In addition, the spring-loaded contacts 50 are maintained in continuous engagement with the conductive traces 32 regardless of the orientation of the electronic device 10 relative to the dock housing 41.

Figure 11:
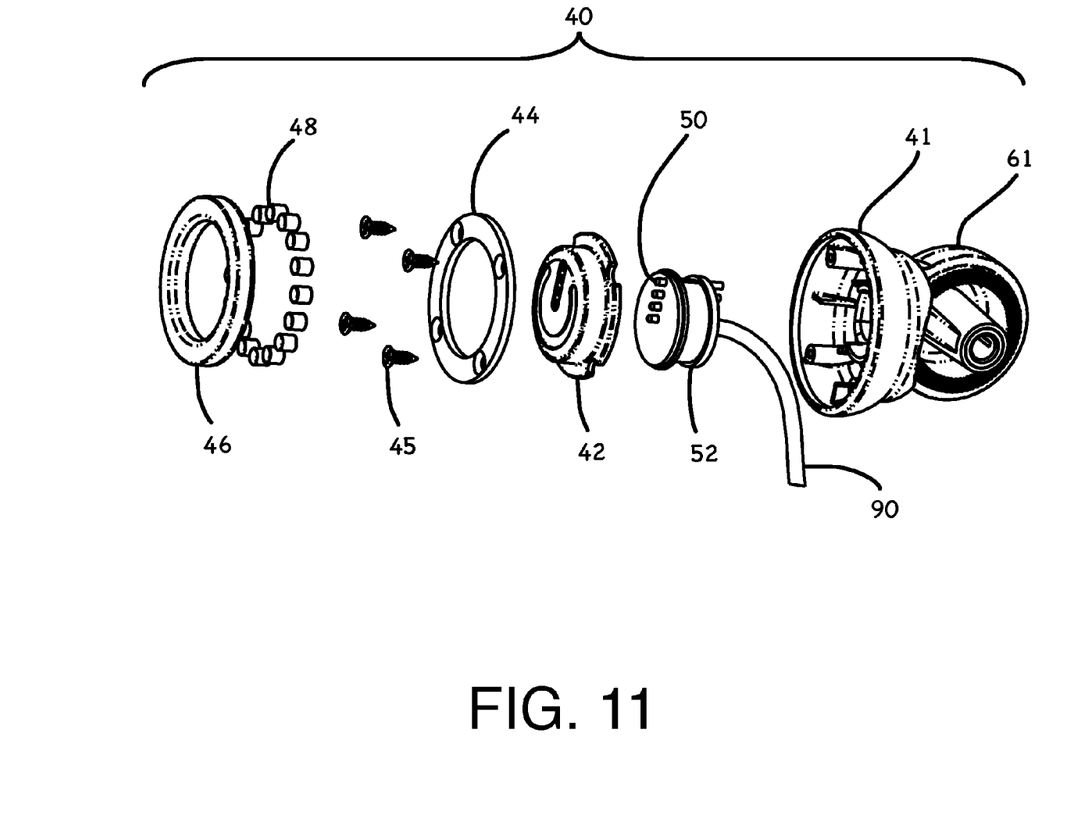
FIG. 11 is an exploded illustration of an embodiment of a dock interface assembly.

FIG. 11 is an exploded view of an embodiment of the dock interface assembly 40. As indicated above, the magnet holder 46 may include a plurality of magnets 48 that create the magnetic attraction F to the metallic element 26 of the case assembly 20. When the dock interface assembly 40 is part of a dock assembly 60 for home use A or vehicle use B, the magnetic attraction F allows for convenient one-handed operation to mount the electronic device 10 to the dock interface assembly 40. In this regard, the mounting system 12 disclosed herein provides a significant advantage over the prior art by providing the ability to mount the electronic device 10 by simply positioning the case assembly 20 onto the dock interface assembly 40 causing the spring-loaded contacts 50 to make a data connection D and/or a power connection E between the electronic device 10 and the dock interface assembly 40.

In FIG. 11 as indicated above, the dock interface assembly 40 may include a magnet holder 46 configured to house or retain a plurality of the magnets 48. The magnets 48 may be pressed into one or more magnet pockets (FIGS. 12-13) that may be formed on a back side of the magnet holder 46. In an embodiment, the magnets 48 may be mechanically retained or adhesively bonded to the magnet holder 46. In a further embodiment, the magnet holder 46 may be configured such that the magnets 48 are slidably removable from the magnet holder 46 to allow for reconfiguring the quantity, position, and orientation of the magnets 48. However, other means can be used to provide the magnetic attraction F (FIG. 1) between the metallic element 26 and the dock interface assembly 40, and is not limited to the magnet holder 46 embodiment disclosed herein.

In the embodiment of FIG. 11, the dock interface assembly 40 includes the dock housing 41. The contacts 50 may be coupled to a printed circuit board 52 of the dock interface assembly 40. In an embodiment, the contacts 50 may protrude from a printed circuit board 52 of the dock interface assembly 40. The printed circuit board 52 may be coupled to a cable 90 such as a USB cable 90. The spring-loaded contacts 50 may protrude through a dock contact face 42. The dock contact face 42 may be fixed in position. For example, the dock contact face 42 may be held in place by a metallic clamping ring 44 (e.g. steel ring) which may clamp the dock contact face 42 between the metallic clamping ring 44 and an upper edge of the dock housing 41. The magnet holder 46 may advantageously be installed in a manner allowing for direct contact between the magnets 48 and the clamping ring 44 connected to the dock housing 41 via screws 45. This direct contact results in greater strength of magnetic attraction between the clamping ring 44 and the magnets 48 than strength of the magnetic attraction F between the magnets 48 and the metallic element 26 of the case assembly 20. In this manner, the magnet holder 46 may remain attached to the clamping ring 44 without the use of mechanical fasteners. The lack of mechanical fasteners provides a convenient means for replacing or reconfiguring the magnet holder 46 with a different configuration of magnets 48 such as to provide more or less magnetic attraction F to the metallic element 26.

Figure 12:
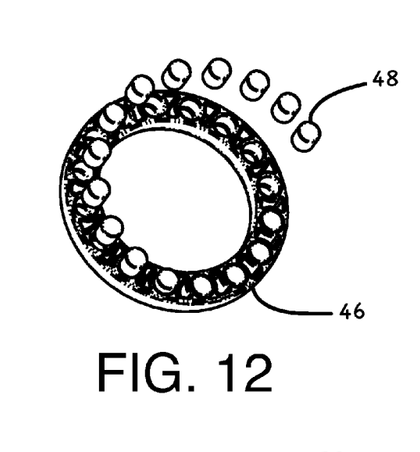
FIG. 12 is a perspective illustration of an underside of a magnet holder of the dock interface assembly.
Figure 13:
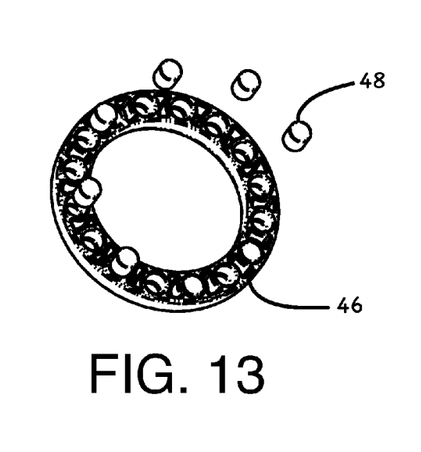
FIG. 13 is a perspective illustration of the magnet holder of the magnet holder of FIG. 11 after reconfiguration of the magnet holder by removing a portion of the magnets.

Referring to FIGS. 12-13, shown is a partial exploded view of two different magnet 48 arrangements that may be used with the magnet holder 46, although the magnets 48 may be provided in any arrangement other than the arrangements shown in FIGS. 12-13. Each one of the magnets 48 is shown having a cylindrical shape or a disc shape. However, the magnets 48 may be provided in any shape such as in an arcuate shape or in other shapes. The magnet holder 46 may include one or more magnet pockets that may be configured complementary to the shape of the magnets 48. In an embodiment, the magnet holder may be provided with a single magnet (not shown) having a circular shape or a ring shape configured complementary to the shape of the magnet holder 46. In a further embodiment, the magnet holder 46 may be omitted, and the magnet(s) 48 may be coupled to the metallic element 26 or mechanically fastened to the dock housing 41 in any one of a variety of different arrangements. In an embodiment, the magnet holder 46 may be configured to removably retain the magnets 48 in a manner such that the magnets 48 may be removed and inserted into the magnet holder 46.

In a further embodiment not shown, the north/south poles (not shown) of the magnets 48 may be oriented relative to one another to increase or decrease the strength of the magnetic attraction F between the metallic element 26 and the dock interface assembly 40. In this regard, each magnet 48 may have a north pole and a south pole located at opposite ends of the magnet 48. The magnets 48 in the magnet holder 46 may be arranged with the alternating north pole and south pole facing outwardly away from the dock housing 41, and which may result in a reduced depth of the magnetic field, and therefore a reduced strength of the magnetic attraction F between the metallic element 26 and the dock interface assembly 40, as compared to an increased strength of magnetic attraction F between the metallic element 26 and the dock interface assembly 40 that may occur for an arrangement wherein the north pole of all of the magnets 48 faces outwardly away from the dock interface assembly 40.

In a further embodiment not shown, the mounting system 12 may be configured with one or more magnets 48 provided with both the case assembly 20 and the dock housing 41, to provide increased flexibility for controlling the strength of the magnetic attraction F. Even further, the magnet(s) 48 on the case assembly 20 may be oriented such that the north pole is facing outwardly toward the dock housing 41, and the magnet(s) 48 on the dock housing 41 are oriented such that the north pole is facing outwardly toward the case assembly 20. Due to the repelling action between the north poles of the magnets (48) on the case assembly 20 and the dock housing 41, the electronic device 10 may be clocked into a desired clocking orientation relative to the dock interface assembly 40. For example, the magnets 48 on the case assembly 20 and on the dock housing 41 may be arranged such that the electronic device 10 assumes a predetermined angular orientation (e.g., a portrait orientation, or a landscape orientation) whenever the electronic device 10 is magnetically coupled to the dock interface assembly 40. Further in this regard, equal quantities of magnets 48 (e.g., 18 magnets) may be included with the case assembly 20 and with the dock housing 41 to provide a desired clocking angle increment (e.g. 360 degrees/18 magnets=20 degree clocking increment) of the electronic device 10 relative to the dock interface assembly 40.

In FIGS. 12-13, as was indicated earlier, the magnet holder 46 may be configured to provide more or less magnetic attraction F to the metallic element 26 on the case assembly 20 of the electronic device 10. In FIG. 12, the magnet holder 46 includes a plurality of magnet pockets which are each filled with a magnet 48. In FIG. 13, only half of the magnet pockets are filled with a magnet 48 resulting in reduced magnetic attraction F. In this regard, the magnet holder 46 provides flexibility with regard to the magnitude of magnetic attraction F in that the quantity of magnets 48 may be tuned to provide the proper amount of magnetic coupling for a given mounting application. For example, it may be advantageous for a dock assembly 60 used on a desk to have a reduced amount of magnetic attraction F so that the dock housing base 64 remains stationary and does not slide along the desk surface when the electronic device 10 is removed from the dock interface assembly 40. On the other hand, for environments having relatively high levels of vibration and where the dock assembly base 64 is physically attached to a support (not shown), it may be advantageous to have increased magnetic attraction F to prevent the electronic device 10 from being knocked off of the dock interface assembly 40.

Figure 14:
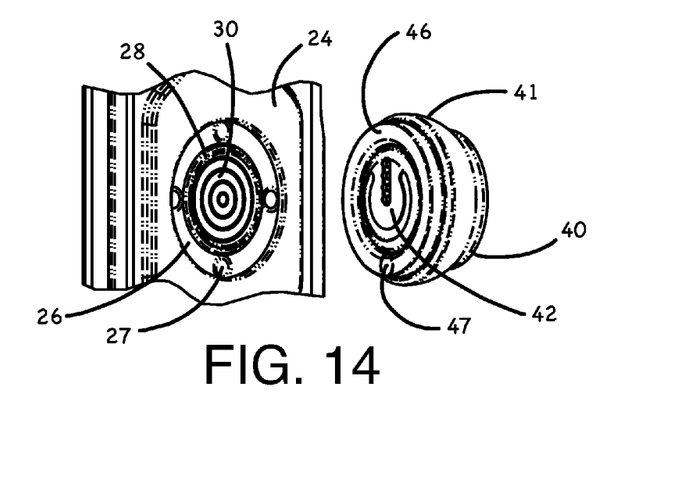
FIG. 14 is a perspective illustration of an embodiment of the mounting system including dimples and corresponding protrusions in the magnet holder and the metallic ring for controlling the clocking orientation of the electronic device relative to the dock interface assembly.

Referring to FIG. 14, shown is an enlarged view of the case assembly 20 which is shown facing an embodiment of the magnetic dock interface assembly 40. FIG. 14 illustrates the optional use of one or more clocking dimples 47 on the magnet holder 46. In this regard, the magnet holder 46 may include one or more clocking dimples 47 or clocking protrusions (not shown) for engaging a corresponding clocking dimple 27 or clocking protrusion on the metallic element 26. The clocking dimple 27, and clocking protrusion 47 may provide a means to index the electronic device 10 to a predetermined clocking orientation of the electronic device 10, such as in a vertical orientation (e.g., portrait mode) or a horizontal orientation (e.g., landscape mode) a of the electronic device 10. When the case assembly 20 is rotated while installed on the dock interface assembly 40, the clocking dimple 47 on the magnet holder 46 may ride against the metallic element 26 and detent into the matching clocking dimple 27 in the metallic element 26. It should be noted that the embodiment illustrated in FIG. 14 is not intended to be limiting to other embodiments that may be incorporated for providing a clocking feature for the electronic device 10.

Figure 15:
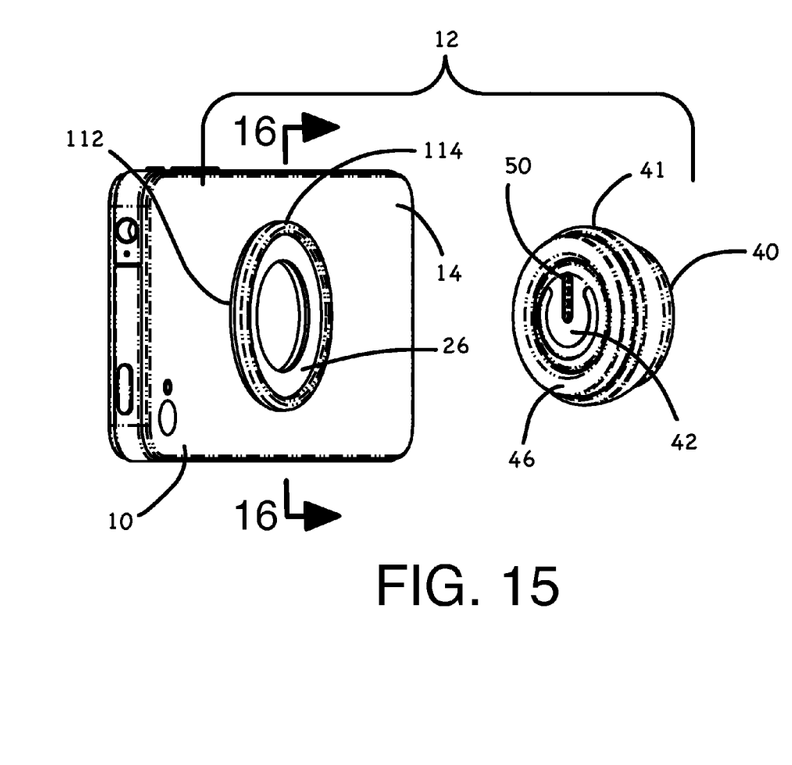
FIG. 15 is a perspective illustration of an embodiment of the mounting system including a locating ring applied directly to the smart phone for aligning the dock interface assembly therewith.
Figure 16:
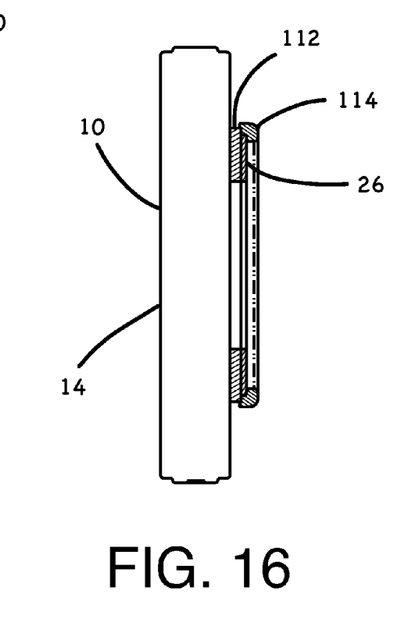
FIG. 16 is a cross sectional illustration taken along line 16 of FIG. 15 and illustrating a locating ring and a metallic ring mounted directly to the smart phone.

Referring to FIGS. 15-16, shown is an exploded perspective view of an electronic device 10 fitted with a locating rim 114 and metallic element 26 applied directly to an outer case (not shown) of the electronic device 10. In FIG. 15, shown is the magnetic dock interface assembly 40 to which the electronic device 10 may be magnetically coupled. In this regard, if a data connection or charging connection is not necessary, the electronic device 10 may still be mounted to a dock interface assembly 40 by affixing a metallic element 26 and a locating rim 114 directly to the outer case of the electronic device 10 such as via double-sided foam tape 112. In this manner, other electronic devices 10, which may not have their own case assembly 20, may be coupled to the dock interface assembly 40.

The above description is given by way of example, and not limitation. Given the above disclosure, one skilled in the art could devise variations that are within the scope and spirit of the disclosure provided herein, including various ways of interconnecting the magnet holder 46 to the dock interface assembly 40. In addition one skilled in the art could devise variations in connecting the metallic element 26 to the electronic device 10, variations in the configuration and mounting arrangement of the case PCB 30, variations in the configuration and mounting of the spring-loaded contacts 50 in the dock interface assembly 40 and attachments thereof to dock assemblies for use at home A, in an automobile B, on a bicycle C, and other variations that are within the spirit and scope of the present disclosure. Furthermore, the various features of the embodiments disclosed herein can be used alone, or in varying combinations with each other, and are not intended to be limited to the specific combination described herein. Thus, the scope of the claims is not to be limited by the illustrated embodiments.

What is claimed is:

1. A mounting system for an electronic device, comprising:
 a dock interface assembly including a dock housing having one or more contacts;
 a case assembly including an alignment feature and a case printed circuit board having one or more conductive traces corresponding to the contacts;
 one of the dock interface assembly and the case assembly having a metallic element;
 a remaining one of the dock interface assembly and the case assembly having one or more magnets arranged complementary to the metallic element for magnetic coupling of the case assembly to the dock interface assembly; and
 the dock housing being configured to be received by the alignment feature in a manner such that at least one of the contacts is aligned with and electrically coupled to a corresponding one of the conductive traces.

2. The mounting system of claim 1, wherein:
 the case printed circuit board has a connector configured to engage a connector port of the electronic device.

3. The mounting system of claim 1, wherein:
 the electronic device is rotatable relative to the dock interface assembly when the metallic element is magnetically coupled to the dock interface assembly.

4. The mounting system of claim 1, wherein:
 the contacts are spring-loaded such that the contacts are maintained in contacting relation with the conductive traces.

5. The mounting system of claim 1, wherein:
 the contacts are provided in a linear arrangement.

6. The mounting system of claim 1, wherein:
 the contacts are coupled to a cable for transferring at least one of power and data through the contacts and into the conductive traces of the case printed circuit board for the electronic device.

7. The mounting system of claim 1, wherein:
 the alignment feature comprises a circular opening formed in a cover of the case assembly;
 the dock housing having a circular outer shape configured to nest within the circular opening; and
 the conductive traces having an annular configuration arranged in a manner such that the contacts are maintained in contacting relation with the conductive traces when the electronic device is rotated relative to the dock interface assembly.

8. The mounting system of claim 1, wherein:
the metallic element comprises a metallic ring being sized and configured to circumscribe the conductive traces of the case printed circuit board.

9. The mounting system of claim 8, wherein:
the dock interface assembly includes a magnet holder configured for holding a plurality of magnets in an arrangement complementary to the metallic ring.

10. The mounting system of claim 9, wherein:
the magnet holder is configured to removably retain the magnets in a manner such that the magnets may be reconfigured for changing a magnitude of magnetic coupling to the metallic ring.

11. The mounting system of claim 9, wherein:
the magnet holder includes at least one of a clocking dimple and a clocking protrusion configured to engage a corresponding clocking dimple and clocking protrusion formed in the metallic ring; and
the clocking dimple and clocking protrusion being configured to index the electronic device into a predetermined clocking orientation of the electronic device.

12. The mounting system of claim 1, wherein:
the dock interface assembly includes a metal clamping ring being fixedly coupled to the dock housing; and
the magnets being magnetically coupled to the metal clamping ring.

13. The mounting system of claim 1, wherein:
the contacts protrudes outwardly from a printed circuit board of the dock interface assembly; and
the printed circuit board of the dock interface assembly being coupled to a universal serial bus (USB) cable.

14. The mounting system of claim 13, wherein:
the cable is configured to be coupled to a wall charger.

15. The mounting system of claim 1, wherein:
the dock housing is coupled to a dock assembly base; and
the dock assembly base including at least one locking hinge for adjusting an orientation of the dock interface assembly relative to the dock assembly base.

16. The mounting system of claim 15, wherein:
the dock housing is coupled to a dock assembly base including a weight for fixedly mounting the dock assembly to a surface.

17. The mounting system of claim 15, wherein:
the dock housing is coupled to a bar clamp configured for removably clamping the dock assembly to a bar.

18. A mounting system for a smart phone, comprising:
a dock interface assembly including a dock housing containing one or more magnets arranged in a circular array, the dock housing containing one or more contacts protruding from the dock housing; and
a case assembly having a cover including an alignment feature configured as a circular opening, a metallic ring disposed within the circular opening, and a case printed circuit board being circumscribed by the metallic ring and having one or more annular conductive traces corresponding to the contacts;
the metallic ring being configured complementary to an arrangement of the magnets for magnetic coupling of the metallic ring to the dock interface assembly;
the dock housing having a circular outer perimeter configured to be received by the alignment feature such that each one of the contacts engages a corresponding one of the conductive traces;
the contacts being configured to be electrically coupled to the conductive traces of the case printed circuit board, the case printed circuit board including a connector configured to engage a connector port of the smart phone; and
the contacts being coupled to a cable transmitting at least one of power and data to the contacts, into the conductive traces, through the connector, and into the smart phone while the smart phone is magnetically coupled to the dock interface assembly and during rotation thereof.

19. The mounting system of claim 18, wherein:
the cable is configured to be coupled to a wall charger.

20. The mounting system of claim 18, wherein:
the dock interface assembly includes a ring-shaped magnet holder configured for holding a plurality of the magnets in a circular array configured complementary to the metallic ring; and
the magnets being removably retained within the magnet holder in a manner such that the magnets may be reconfigured.

\* \* \* \* \*